(12) United States Patent
Lee et al.

(10) Patent No.: US 7,212,256 B2
(45) Date of Patent: May 1, 2007

(54) LIQUID CRYSTAL DISPLAY DEVICE AND FABRICATION METHOD THEREOF

(75) Inventors: Deuk-Su Lee, Taoyuan Hsien (TW); Jeremy Park, Yangmei Township, Taoyuan County (TW); Ming-Tien Lin, Lujhou (TW)

(73) Assignee: Hannstar Display Corp., Taipei, Taiwan (CN)

( * ) Notice: Subject to any disclaimer, the term of this patent is extended or adjusted under 35 U.S.C. 154(b) by 497 days.

(21) Appl. No.: 10/621,881

(22) Filed: Jul. 17, 2003

(65) Prior Publication Data

US 2005/0012699 A1    Jan. 20, 2005

(51) Int. Cl.
*G02F 1/1368* (2006.01)
*G02F 1/1337* (2006.01)

(52) U.S. Cl. .................... 349/43; 349/110; 349/111; 349/123

(58) Field of Classification Search ............... 349/42, 349/43, 106, 110, 111, 123, 132, 187; 345/87, 345/92; 438/30
See application file for complete search history.

(56) References Cited

U.S. PATENT DOCUMENTS

2001/0046003 A1* 11/2001 Song ........................ 349/43
2002/0171782 A1* 11/2002 Yee et al. .................. 349/43

* cited by examiner

*Primary Examiner*—Ton Toan
*Assistant Examiner*—Tai Duong
(74) *Attorney, Agent, or Firm*—Thomas, Kayden, Horstemeyer & Risley (57) ABSTRACT

A liquid crystal display device has a pixel electrode layer formed between a first data bus line and a second bus line. A first space between the first data bus line and the periphery of the pixel electrode layer is different from a second space between the second data bus line and the periphery of the pixel electrode layer.

38 Claims, 7 Drawing Sheets

LIQUID CRYSTAL DISPLAY DEVICE AND FABRICATION METHOD THEREOF

BACKGROUND OF THE INVENTION

1. Field of the Invention

The invention relates to a liquid crystal display (LCD) device and more particularly to an LCD device with a non-symmetric design for a space between a data bus line and a pixel electrode in order to effectively prevent a disclination effect generated in a liquid crystal reverse region.

2. Description of the Related Art

Liquid crystal display (LCD) devices are a well-known form of flat panel display with advantages of low power consumption, light weight, thin profile and low driving voltage. Liquid crystal molecules change their orientations and photo-electronic effects when an electrical field is applied. In an LCD display region, an array of pixel regions is patterned by horizontally extended scanning bus lines and vertically extended data bus lines. For a TFT-LCD device, each pixel region has a thin film transistor (TFT) and a pixel electrode, in which the TFT serves as a switching device. The conventional electrode array design for a TFT-LCD device, however, has the disadvantage of the so-called Mura phenomenon caused by a disclination effect. The Mura phenomenon is considered a push Mura area with light strips which are visible on the LCD screen and detectable in gray scale.

The disclination effect is caused by a strong lateral direction electrical field between the pixel electrode and the data bus line, resulting in a light leakage area. In order to eliminate the disclination effect, a transparent insulating film with a thickness of 1 μm or more is interposed between the data bus line and the pixel electrode, and the space between two adjacent pixel electrodes is narrowed to reach 2~5 μm to overlap the periphery of the data bus line. This electrode array design, however, causes problems of coupling capacitance and cross talk between the pixel electrode and the data bus line.

Figure 1:
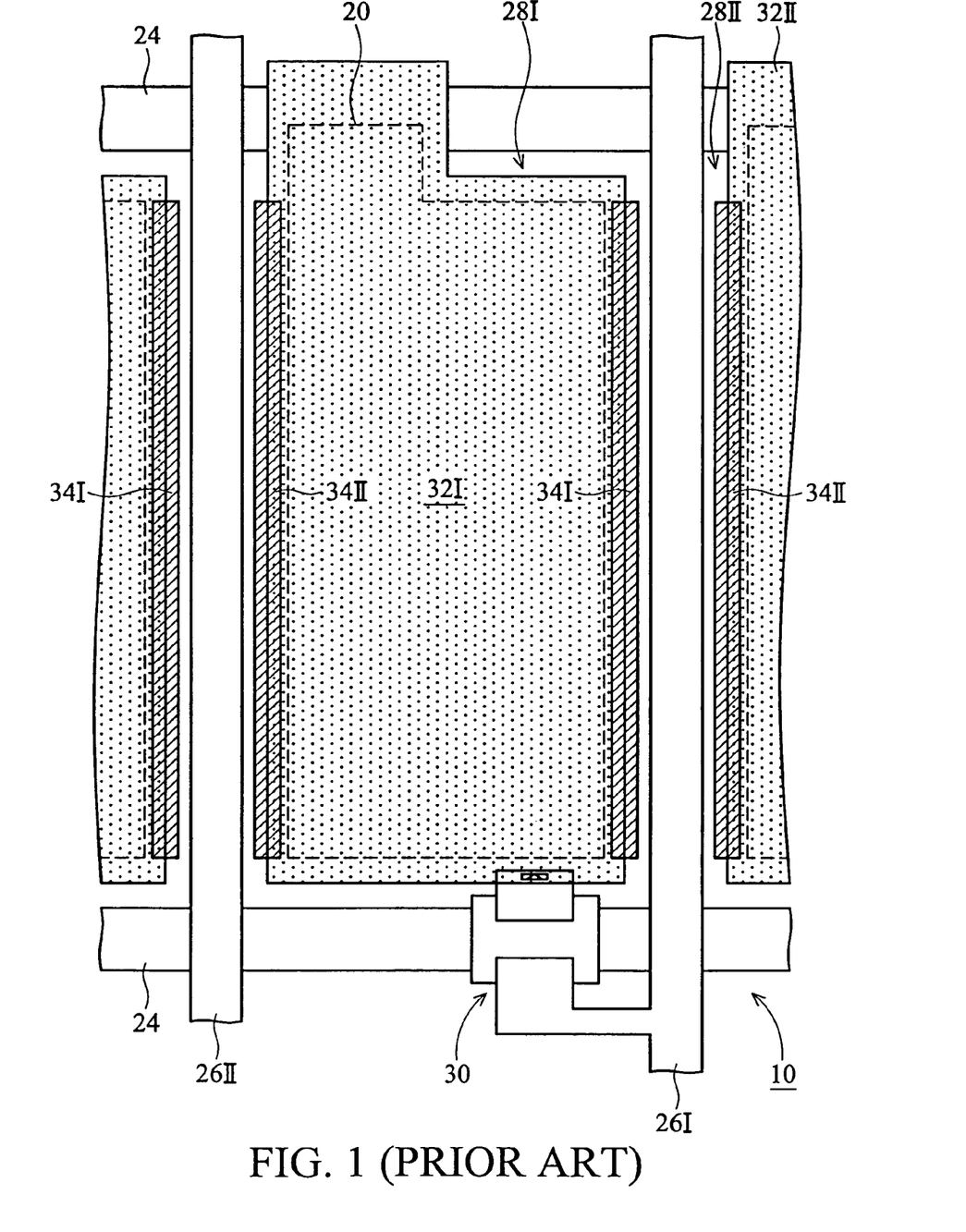
FIG. 1 is a plane view illustrating an electrode array of a conventional TFT-LCD device.
Figure 2:
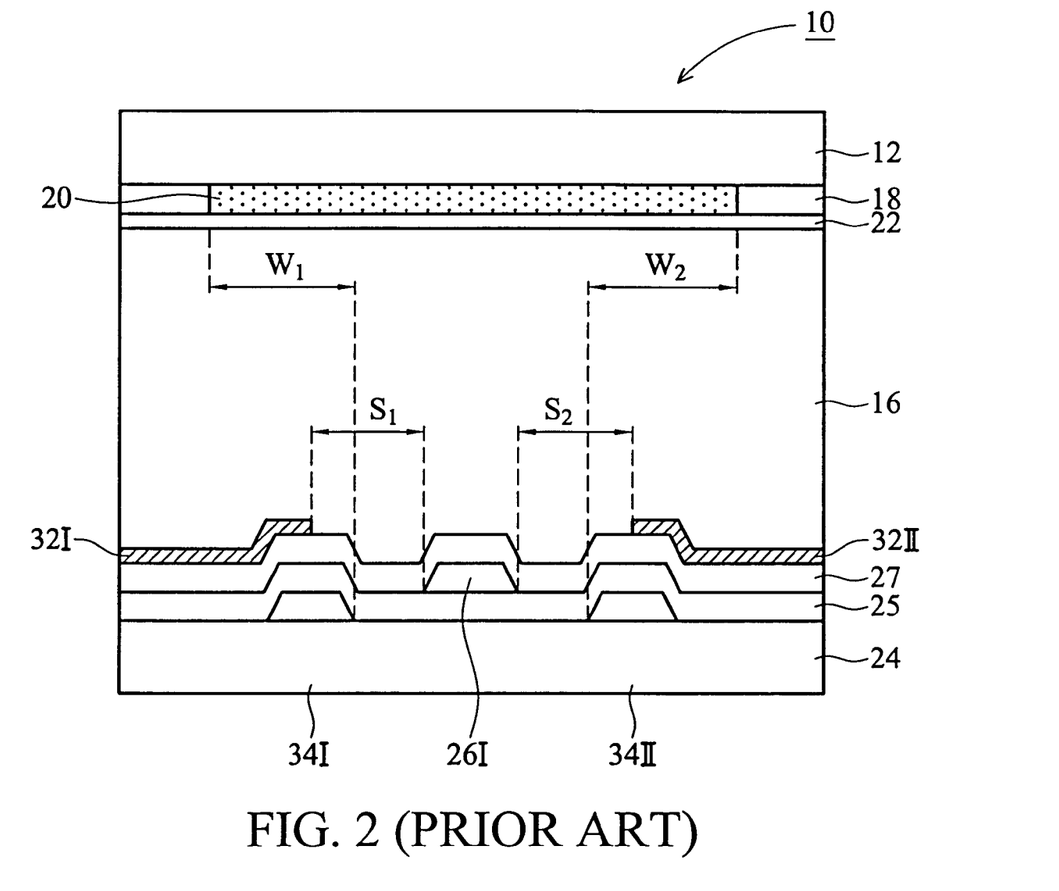
FIG. 2 is a cross-section along line 1—1 of FIG. 1 illustrating the space between the data bus line and the pixel electrode.

Currently, two approaches to the disclination effect have been developed, in which one is to keep a sufficient space between the pixel electrode and the data bus line, and the other one is to employ a BM (black matrix) pattern for shielding the light leakage area. FIG. 1 is a plane view illustrating an electrode array of a conventional TFT-LCD device. FIG. 2 is a cross-section along line 1—1 of FIG. 1 illustrating the space between the data bus line and the pixel electrode. A TFT-LCD device 10 comprises an upper glass substrate 12, a lower glass substrate 14 and an LC layer 16 interposed therebetween. The upper glass substrate 12 comprises a color filter (CF) layer 18, a black matrix (BM) layer 20 and a common electrode layer 22. The lower glass substrate 14 comprises a plurality of horizontally extended scanning bus lines 24 and a plurality of vertically extended data bus lines 26 which are perpendicularly arranged in a matrix form to define a plurality of pixel areas 28. Each of the pixel areas 28 comprises a TFT device 30, a pixel electrode layer 32 and a pair of light-shielding layers 34.

First, a first metal layer is deposited and patterned as the light-shielding layers 34 and the scanning bus lines 24, and then a gate insulating layer 25 is deposited thereon. Next, a second metal layer is deposited and patterned as the data bus lines 26, and then a passivation layer 27 is deposited on the data bus lines 26 and the gate insulating layer 27. Next, a transparent conductive layer is deposited and patterned as the pixel electrode layer 32. In addition, the BM layer 20 overlap the TFT device 30, the light-leakage gap between the scanning bus line 24 and the periphery of the pixel electrode layer 32, and the light-leakage gap between the data bus line 26 and the periphery of the pixel electrode layer 32. Also, the BM layer 20 may fully overlaps the light-shielding layers 34.

In FIG. 1, the light-shielding layer 34 extends along the data bus line 26 without connecting the scanning bus line 24 and is positioned in a space between the data bus line 26 and the periphery of the pixel electrode layer 32. Preferably, in the first pixel area 28I, the first light-shielding layer 34I is positioned in a first space between the first data bus line 26I and the periphery of the first pixel electrode layer 32I, and the second light-shielding layer 34II is positioned in a second space between the second data bus line 26II and the periphery of the first pixel electrode layer 32I. Also, the first-shielding layer 34I is partially overlapped by the periphery of the first pixel electrode layer 32I, and the second-shielding layer 34II is partially overlapped by the periphery of the first pixel electrode layer 32I.

In FIG. 2, using the first data bus line 26I as the criterion, a symbol "$S_1$" indicates a first space between the first data bus line 34I and the periphery of the first pixel electrode layer 32I within the first pixel area 28I, and a symbol "$S_2$" indicates a second space between the first data bus line 26I and the periphery of the second pixel electrode layer 32I within the second pixel area 28II. According to a symmetric design, the first space $S_1$ is equal to the second space $S_2$, approximately 3.5 μm. Also, a symbol "$W_1$" indicates a first overlapping width between the BM layer 20 and the first light-shielding layer 34I, and a symbol "$W_2$" indicates a second overlapping width between the BM layer 20 and the second light-shielding layer 34II. According to a symmetric design, the first overlapping width $W_1$ is equal to the second overlapping width $W_2$, approximately 6.0 μm.

Figure 3:
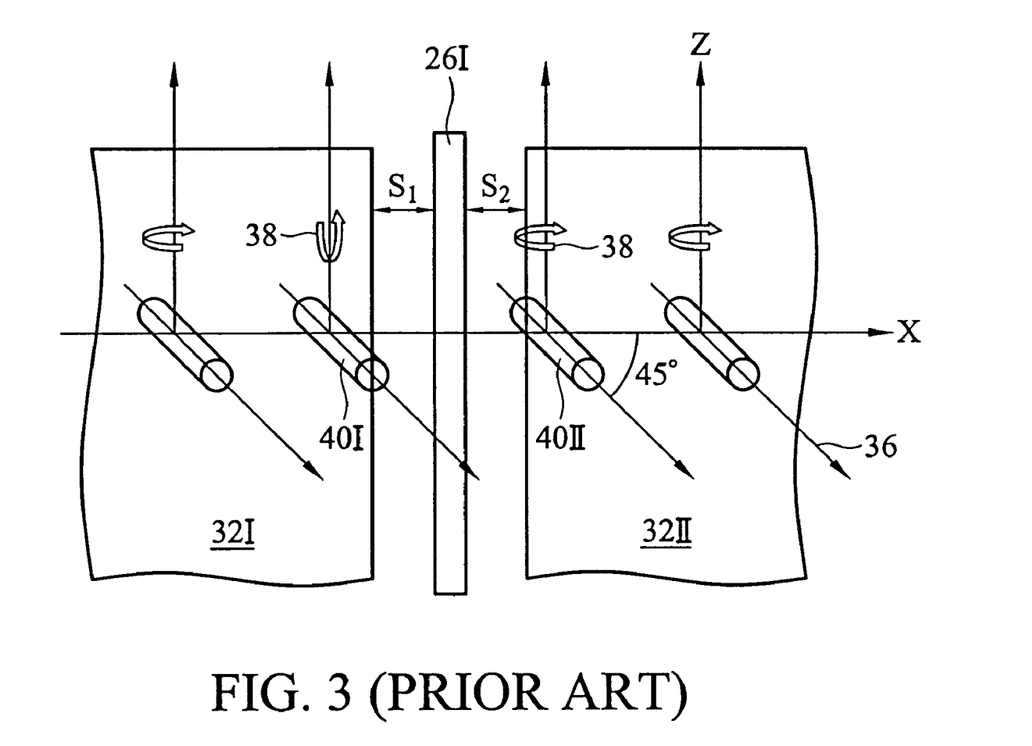
FIG. 3 is a plane view illustrating the disclination level in the first space and the second space.

In order to prevent the disclination effect, the conventional TFT-LCD device 10 employs the sufficient space $S_1$ or $S_2$ to minimize the coupling capacitance and the electrical field between the data bus line 26 and the periphery of the pixel electrode layer 32. The symmetric design rule for the spaces $S_1$ and $S_2$, however, is ineffective because the disclination level in the first space $S_1$ is different from that in the second space $S_2$ in accordance with a rubbing direction and the LC molecule rotation. FIG. 3 is a plane view illustrating the disclination level in the first space $S_1$ and the second space $S_2$. An arrow 36 indicates a rubbing direction on an alignment film, an arrow 38 indicates an LC rotating direction, and the character 40 indicates an LC molecule. When an outer voltage is applied to the TFT-LCD device 10, the LC molecules 40 arise in a pretilt direction in accordance with the rubbing direction 36. When a strong lateral electrical field between the pixel electrode layer 32 and the data bus line 26 is generated in reverse to the pretilt direction, the LC molecule 40 is oriented to the direction of the lateral electrical field to reach a reverse tilt state, resulting in a disclination effect at a boundary between the normal tilt region and the reverse tilt region. In particular when the rubbing direction 36 is at a 45° angle to the X axis, the LC molecule 40I adjacent to the first space $S_1$ always rotates to the reverse tilt state, thus the disclination effect adjacent to the first space $S_1$ is more serious than that adjacent to the second space $S_2$. Based on the symmetric design for the first space $S_1$ and the second space $S_2$, a larger space between the data bus line 26 and the periphery of the pixel electrode layer 32 is required to solve the disclination effect found in the first space $S_1$, but an accompanying problem of increased light leakage occurs.

SUMMARY OF THE INVENTION

Accordingly, an object of the present invention is to provide an LCD device with a non-symmetric design for a space between a pixel electrode and a data bus line in order to effectively prevent a disclination effect generated in a liquid crystal reverse region.

According to the object of the invention, a liquid crystal display device comprises a first substrate, a second substrate and a liquid crystal layer formed therebetween. A plurality of scanning bus lines and a plurality of data bus lines are perpendicularly arranged in a matrix form to define a plurality of pixel areas. A plurality of TFT devices is formed in the plurality of pixels, respectively. A plurality of pixel electrode layers is formed in the plurality of pixels, respectively. In each pixel area, the pixel electrode layer is formed between a first data bus line and a second data bus line, and a first space between the first data bus line and the periphery of the pixel electrode layer is different from a second space between the second data bus line and the periphery of the pixel electrode layer.

DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

First Embodiment

Figure 4:
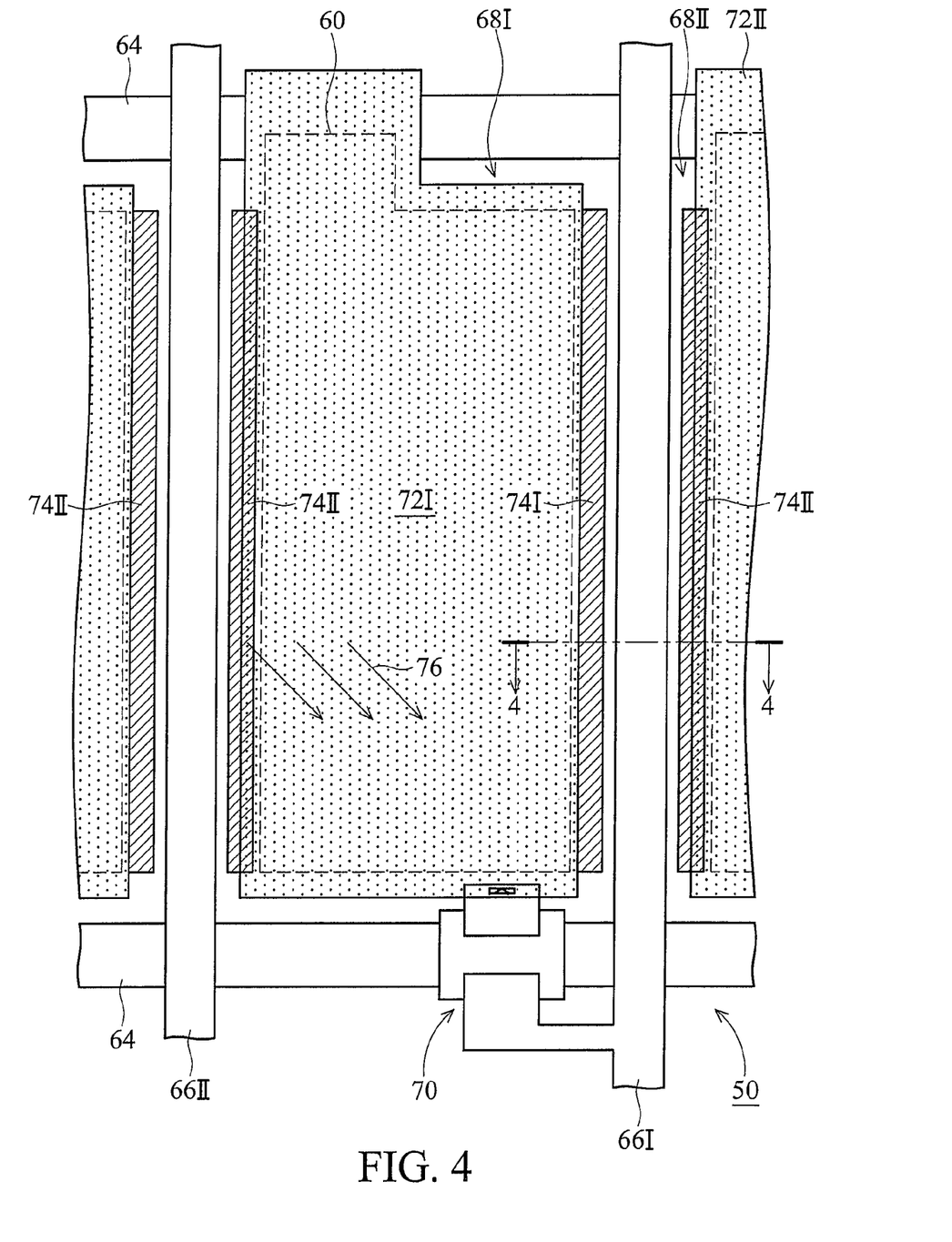
FIG. 4 is a plane view illustrating an electrode array of a TFT-LCD device according to the first embodiment of the present invention.
Figure 5:
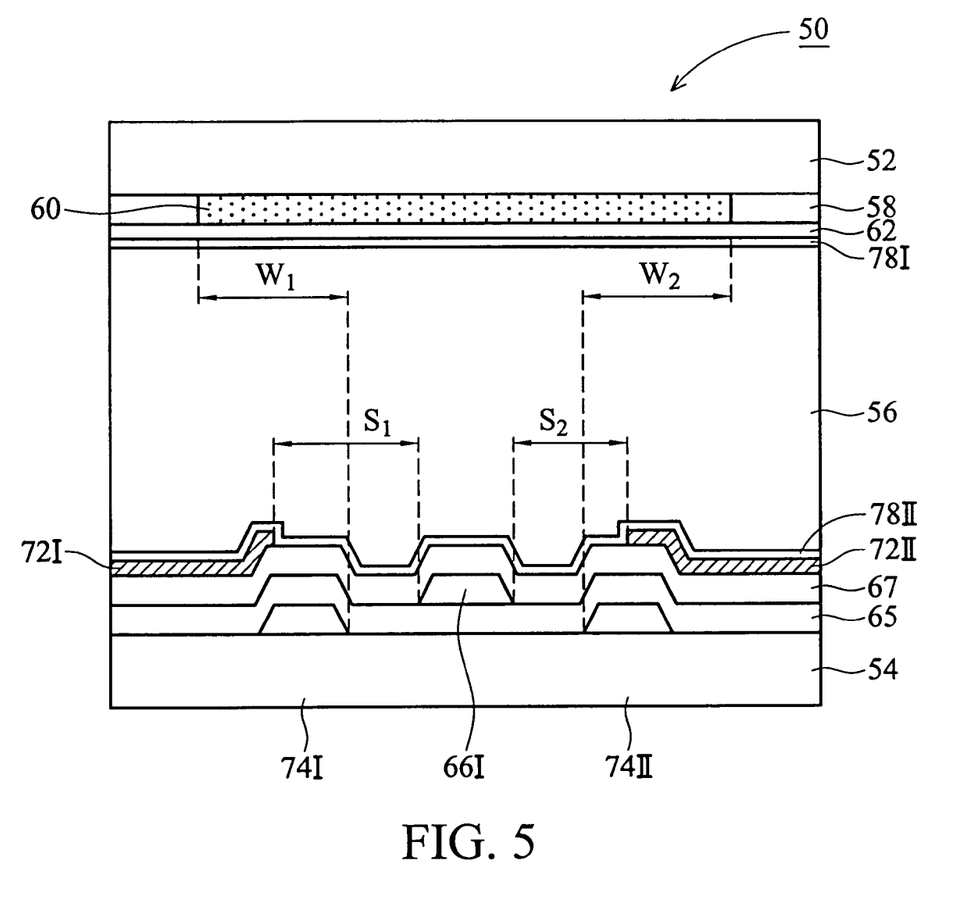
FIG. 5 is a cross-section along line 4—4 of FIG. 4 illustrating the non-symmetric design for the data bus line and the pixel electrode.

FIG. 4 is a plane view illustrating an electrode array of a TFT-LCD device according to the first embodiment of the present invention. FIG. 5 is a cross-section along line 4—4 of FIG. 4 illustrating the non-symmetric design for the data bus line and the pixel electrode.

A TFT-LCD device 50 comprises an upper substrate 52, a lower substrate 54 and an LC layer 56 interposed therebetween. Preferably, the upper substrate 52 and the lower substrate 54 are glass substrates and opposed to each other in parallel. The upper substrate 52 comprises a color filter (CF) layer 58, an opaque layer 60, a common electrode layer 62 and an upper alignment film 78I with a rubbing direction 76. Preferably, the opaque layer 60 is a black matrix (BM) layer.

The lower substrate 54 comprises a plurality of horizontally extended scanning bus lines 64 and a plurality of vertically extended data bus lines 66 which are perpendicularly arranged in a matrix form to define a plurality of pixel areas 68. Each of the pixel areas 68 comprises a TFT device 70, a pixel electrode layer 72 and a pair of light-shielding layers 74. In addition, the opaque layer 60 overlaps the TFT device 70, the light-leakage gap between the scanning bus line 64 and the periphery of the pixel electrode layer 72, and the light-leakage gap between the data bus line 66 and the periphery of the pixel electrode layer 72. Also, the opaque layer 60 may partially or fully overlap the light-shielding layer 74 in accordance with the non-symmetric design rule of the first embodiment.

The fabrication method for an electrode array on the lower substrate 54 is now described. First, a first metal layer is deposited and patterned as the light-shielding layers 74 and the scanning bus lines 64, and then a gate insulating layer 65 is deposited thereon. Next, a second metal layer is deposited and patterned as the data bus lines 66, and then a passivation layer 67 is deposited on the data bus lines 66 and the gate insulating layer 65. Next, a transparent conductive layer (such as an ITO layer) is deposited and patterned as the pixel electrode layer 72. Finally, a lower alignment film 78II with a rubbing direction 76 is formed on the pixel electrodes layer 72 and the passivation layer 67.

In FIG. 4, the light-shielding layer 74 extends along the data bus line 66 without connecting the scanning bus line 64 and is positioned in a space between the data bus line 66 and the periphery of the pixel electrode layer 72. Preferably, in the first pixel area 68I, the first light-shielding layer 74I is positioned in a first space between the first data bus line 66I and the periphery of the first pixel electrode layer 72I, and the second light-shielding layer 74II is positioned in a second space between the second data bus line 66II and the periphery of the first pixel electrode layer 72I. Moreover, in accordance with the non-symmetric design rule of the first embodiment, the first-shielding layer 74I or the second-shielding layer 74II may be partially overlapped by the periphery of the first pixel electrode layer 72I. Alternatively, the first-shielding layer 74I or the second-shielding layer 74II may not be overlapped by the periphery of the first pixel electrode layer 72I.

In FIG. 5, using the first data bus line 66I as the criterion, a symbol "$S_1$" indicates a first space between the first data bus line 64I and the periphery of the first pixel electrode layer 72I within the first pixel area 68I, and a symbol "$S_2$" indicates a second space between the first data bus line 66I and the periphery of the second pixel electrode layer 72II within the second pixel area 68II. According to a non-symmetric design for the TFT-LCD device 50, the first space $S_1$ of 3~5 µm and the second space $S_2$ of 3~5 µm satisfy the formula: $S_1 \neq S_2$. Especially when an included angle between the rubbing direction 76 and the data bus line 66 is 40~50 degrees, the first space $S_1$ between the first data bus line 66I and the periphery of the first pixel electrode layer 72I is a liquid crystal reverse region, and the second space $S_2$ between the first data bus line 66I and the periphery of the second pixel electrode layer 72II is a liquid crystal non-reverse region. Thus, the first space $S_1$ and the second space $S_2$ satisfy the formula: $S_1 > S_2$, in which the first space $S_1$ is preferably 4~5 µm, and the second space $S_2$ is preferably 2~3 µm.

Also, a symbol "$W_1$" indicates a first overlapping width between the opaque layer 60 and the first light-shielding layer 74I, and a symbol "$W_2$" indicates a second overlapping width between the opaque layer 60 and the second light-shielding layer 74II. The first embodiment provides a symmetric design for the first overlapping width $W_1$ and the second overlapping width $W_2$, thus the first overlapping width $W_1$ of 5~7 μm and the second overlapping width $W_2$ of 5~7 μm satisfy the formula: $W_1=W_2$. Preferably, the first overlapping width $W_1$ is preferably 6 μm, and the second overlapping width $W_2$ is 6 μm.

Compared with the conventional symmetric design rule for the spaces $S_1$ and $S_2$, the present invention provides a non-symmetric design for the spaces $S_1$ and $S_2$ to effectively prevent the disclination effect from the different disclination levels in the first space $S_1$ and the second space $S_2$. Particularly, the first space $S_1$ larger than the second space $S_2$ can solve the serious disclination effect in the liquid crystal reverse region without increasing light leakage by enlarging the first space $S_1$ and the second space $S_2$ at the same time.

Second Embodiment

Figure 6:
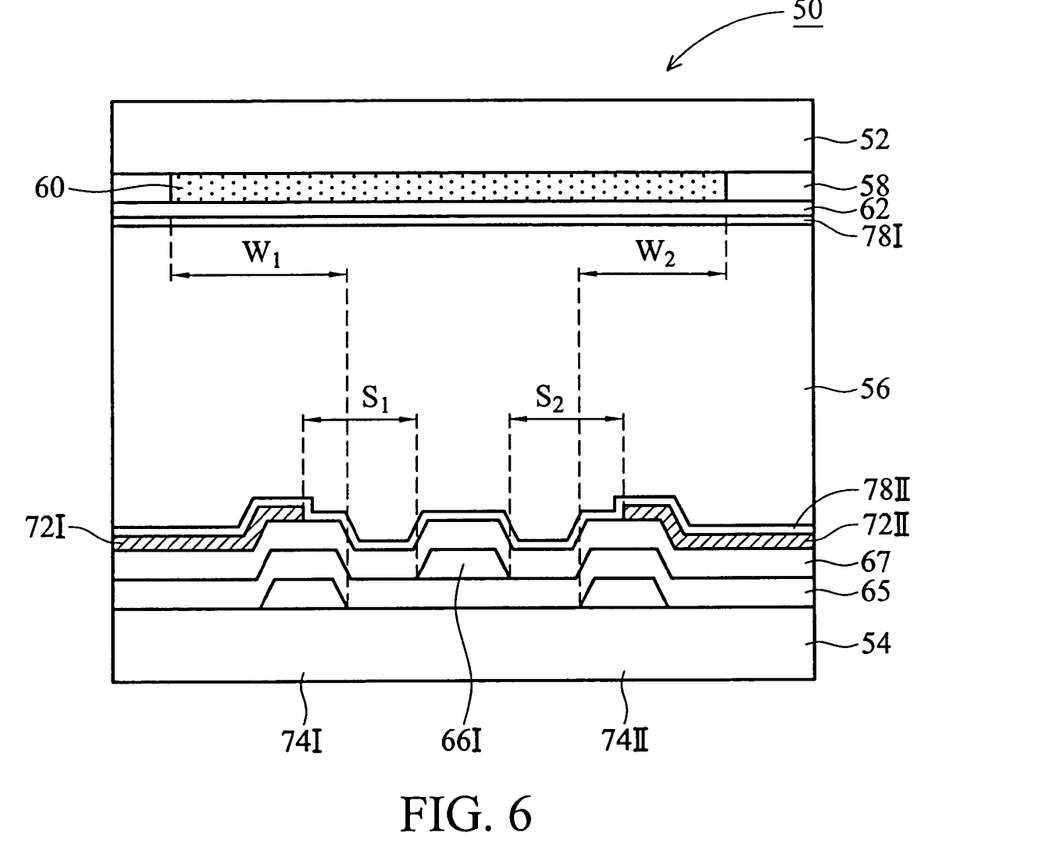
FIG. 6 is a cross-section illustrating a non-symmetric design according to the second embodiment of the present invention.

FIG. 6 is a cross-section illustrating a non-symmetric design according to the second embodiment of the present invention.

The elements in the second embodiment are substantially similar to that of the first embodiment, with the similar portions omitted herein. One dissimilar portion is a non-symmetric design for the first overlapping width $W_1$ and the second overlapping width $W_2$, and the other one dissimilar portion is a symmetric design for the first space $S_1$ and the second space $S_2$. According to a non-symmetric design for the first overlapping width $W_1$ and the second overlapping width $W_2$, the first overlapping width $W_1$ of 4~8 μm and the second overlapping width $W_2$ of 4~8 μm satisfy the formula: $W_1 \neq W_2$. Especially when an included angle between the rubbing direction 76 and the data bus line 66 is 40~50 degrees, the first space $S_1$ is a liquid crystal reverse region, and the second space $S_2$ is a liquid crystal non-reverse region, thus the first overlapping width $W_1$ and the second overlapping width $W_2$ satisfy the formula: $W_1>W_2$, in which the first overlapping width $W_1$ is preferably 6.5~7.5 μm and the second overlapping width $W_2$ is preferably 4.5~5.5 μm. With regard to the symmetric design for the first space $S_1$ and the second space $S_2$, the first space $S_1$ of 3~5 μm and the second space $S_2$ of 3~5 μm satisfy the formula: $S_1=S_2$. Preferably, the first space $S_1$ is 3.5 μm, and the second space $S_2$ is 3.5 μm.

Compared with the conventional symmetric design rule for the overlapping widths $W_1$ and $W_2$, the present invention provides a non-symmetric design for the overlapping widths $W_1$ and $W_2$ to effectively prevent the disclination effect from the different disclination levels in the first overlapping width $W_1$ and the second overlapping width $W_2$. Particularly, the first overlapping width $W_1$ larger than the second overlapping width $W_2$ can solve the serious disclination effect in the liquid crystal reverse region without reducing an aperture ratio by enlarging the overlapping widths $W_1$ and $W_2$ at the same time.

Third Embodiment

Figure 7:
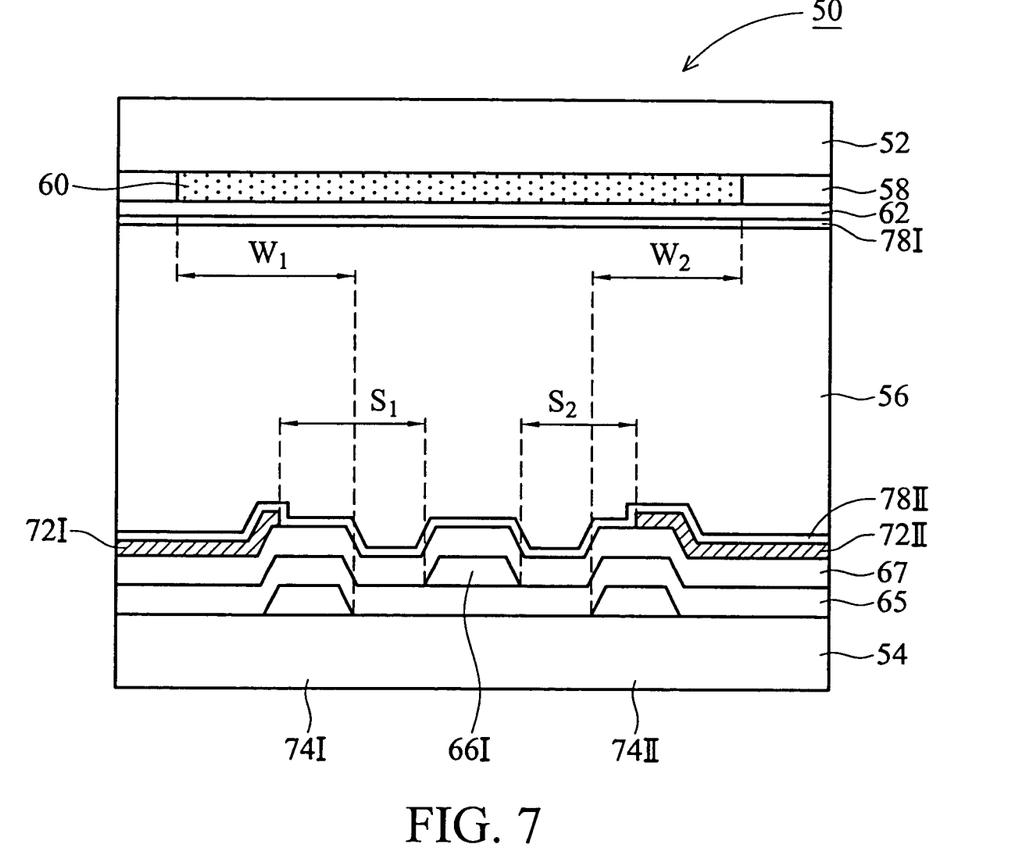
FIG. 7 is a cross-section illustrating a non-symmetric design according to the third embodiment of the present invention.

FIG. 7 is a cross-section illustrating a non-symmetric design according to the third embodiment of the present invention.

The elements in the third embodiment are substantially similar to that of the first embodiment and the second embodiment, with the similar portions omitted herein. The third embodiment combines the non-symmetric design for the spaces $S_1$ and $S_2$ and the non-symmetric design for the overlapping widths $W_1$ and $W_2$ to achieve the advantageous described in the first embodiment and the second embodiment.

According to the non-symmetric design for the spacings $S_1$ and $S_2$, the first space $S_1$ of 3~5 μm and the second space $S_2$ of 3~5 μm satisfy the formula: $S_1 \neq S_2$. Especially when an included angle between the rubbing direction 76 and the data bus line 66 is 40~50 degrees, the first space $S_1$ and the second space $S_2$ satisfy the formula: $S_1>S_2$, in which the first space $S_1$ is preferably 4~5 μm and the second space $S_2$ is preferably 2~3 μm. According to the non-symmetric design for the overlapping widths $W_1$ and $W_2$, the first overlapping width $W_1$ of 4~8 μm and the second overlapping width $W_2$ of 4~8 μcm satisfy the formula: $W_1 \neq W_2$. Especially when an included angle between the rubbing direction 76 and the data bus line 66 is 40~50 degrees, the first overlapping width $W_1$ and the second overlapping width $W_2$ satisfy the formula: $W_1>W_2$, in which the first overlapping width $W_1$ is preferably 6.5~7.5 μm and the second overlapping width $W_2$ is preferably 4.5~5.5 μm.

Compared with the conventional symmetric design rule for the spacings $S_1$ and $S_2$ as well as the conventional symmetric design rule for the overlapping widths $W_1$ and $W_2$, the present invention provides a non-symmetric design for the spacings $S_1$ and $S_2$ as well as a non-symmetric design for the overlapping widths $W_1$ and $W_2$ to effectively prevent the disclination effect from the different disclination levels at opposite sides of the data bus line 66. This solves the serious disclination problem in the liquid crystal reverse region without deteriorating light leakage and sacrificing aperture ratio.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid crystal display device, comprising:
   a first substrate and a second substrate opposing to each other;
   a liquid crystal layer formed between the first substrate and the second substrate;
   a plurality of scanning bus lines and a plurality of data bus lines arranged in a matrix form to define a plurality of pixel areas on the second substrate;
   a plurality of TFT devices formed in the pixel areas respectively; and
   a first pixel electrode and a second pixel electrode formed in the pixel areas respectively;
   wherein one of the data bus lines is disposed between the first pixel electrode and the second pixel electrode, and
   wherein a first space between the data bus line and the first pixel electrode is a liquid crystal reverse region, and a second space between the data bus line and the second pixel electrode is a liquid crystal non-reverse region, and the first space is larger than the second space.

2. The liquid crystal display device as claimed in claim 1, further comprising:
   an alignment film having a rubbing direction in the pixel areas respectively;
   wherein, when an included angle between the rubbing direction and the data bus line is 40~50 degrees.

3. The liquid crystal display as claimed in claim 1, wherein the first space is 4~5 μm and the second space is 2~3 μm.

4. The liquid crystal display device as claimed in claim 1, further comprising:
an opaque layer overlapping the data bus line, the first space and the second space; and
a first light-shielding layer formed adjacent to the first pixel electrode, and a second light-shielding layer formed adjacent to the second pixel electrode;
wherein, a first overlapping width is defined by the opaque layer and the first light-shielding layer, and a second overlapping width is defined by the opaque layer and the second light-shielding layer.

5. The liquid crystal display as claimed in claim 4, wherein the first overlapping width is equal to the second overlapping width.

6. The liquid crystal display as claimed in claim 4, wherein the first overlapping width is different from the second overlapping width.

7. The liquid crystal display device as claimed in claim 6, wherein the first overlapping width is larger than the second overlapping width.

8. The liquid crystal display as claimed in claim 7, wherein the first overlapping width is 6.5~7.5 μm and the second overlapping width is 4.5~5.5 μm.

9. The liquid crystal display device as claimed in claim 4, wherein the second substrate further comprises:
a gate insulating layer formed overlying the second substrate and covering the scanning bus lines and the light-shielding layers, the data bus lines are formed overlying the gate insulating layer; and
a passivation layer formed overlying the gate insulating layer and covering the data bus lines, the first electrode and the second pixel electrode formed overlying the passivation layer.

10. The liquid crystal display as claimed in claim 1, wherein the first substrate further comprises a color filter layer and a common electrode.

11. A liquid crystal display device, comprising:
a first substrate and a second substrate opposing to each other;
a liquid crystal layer formed between the first substrate and the second substrate;
a plurality of scanning bus lines and a plurality of data bus lines arranged in a matrix form to define a plurality of pixel areas on the second substrate;
a plurality of TFT devices formed in the pixel areas respectively;
a first electrode and a second pixel electrode formed in the pixel areas respectively; and
an opaque layer formed overlying the first substrate;
wherein one of the data bus lines is disposed between the first pixel electrode and the second pixel electrode; and
a first space is kept between the first data bus line and the first pixel electrode layer, and a second space is kept between the data bus line and the second pixel electrode;
wherein a first light-shielding layer is formed adjacent to the first pixel electrode and a second light-shielding layer is formed adjacent to the second pixel electrode;
wherein, the opaque layer overlaps the data bus line, the first space and the second space;
wherein a first overlapping width defined by the opaque layer and the first light-shielding layer is different from a second overlapping width defined by the opaque layer and the second light-shielding layer.

12. The liquid crystal display device as claimed in claim 11, further comprising:
an alignment film having a rubbing direction formed in the pixel areas respectively;
wherein an included angle between the rubbing direction and the data bus line is 40~50 degrees, the first space between the first data bus line and the first pixel electrode layer is a liquid crystal reverse region, and the second space between the data bus line and the second pixel electrode is a liquid crystal non-reverse region; and
wherein, the first overlapping width is larger than the second overlapping width.

13. The liquid crystal display as claimed in claim 11, wherein the first overlapping width is 6.5~7.5 μm and the second overlapping width is 4.5~5.5 μm.

14. The liquid crystal display as claimed in claim 11, wherein the first space is equal to the second space.

15. The liquid crystal display as claimed in claim 11, wherein the first space is different from the second space.

16. The liquid crystal display device as claimed in claim 15 wherein the first space is larger than the second space.

17. The liquid crystal display as claimed in claim 16, wherein the first space is 4~5 μm and the second space is 2~3 μm.

18. The liquid crystal display device as claimed in claim 11, wherein the second substrate further comprises:
a gate insulating layer formed overlying the second substrate and covering the scanning bus lines and the light-shielding layers, the data bus lines formed overlying the gate insulating layer; and
a passivation layer formed overlying the gate insulating layer and covering the data bus lines, the first pixel electrode and the second pixel electrode formed overlying the passivation layer.

19. The liquid crystal display as claimed in claim 11, wherein the first substrate further comprises a color filter layer and a common electrode.

20. A fabrication method for a liquid crystal display device, comprising steps of:
providing a first substrate;
forming a plurality of scanning bus lines and a plurality of light-shielding layers overlying the first substrate;
forming a gate insulating layer overlying the first substrate to cover the scanning bus lines and the light-shielding layers;
forming a plurality of data bus lines overlying the gate insulating layer, wherein the data bus lines and the scanning bus lines are arranged in a matrix form to define a plurality of pixel areas;
forming a plurality of TFT devices in the pixel areas respectively; and
forming a first pixel electrode and a second pixel electrode overlying the passivation layer in the pixel areas respectively;
wherein one of the data bus lines is disposed between the first pixel electrode and the second pixel electrode, and a first space between the data bus line and the first pixel electrode is a liquid crystal reverse region, and a second space between the data bus line and the second pixel electrode is a liquid crystal non-reverse region; and
wherein the first space is larger than the second space.

21. The fabrication method for a liquid crystal display device as claimed in claim 20, further comprising a step of:
forming an alignment film having a rubbing direction overlying the first pixel electrode, the second pixel electrode, and the passivation layer;

wherein, when an included angle between the rubbing direction and the data bus line is 40~50 degrees.

22. The fabrication method for a liquid crystal display device as claimed in claim 20, wherein the first space is 4~5 μm and the second space is 2~3 μm.

23. The fabrication method for a liquid crystal display device as claimed in claim 20, further comprising steps:
providing a second substrate opposing to the first substrate; and
forming an opaque layer overlying the second substrate, wherein the opaque layer overlaps the data bus line the first space and the second space;
wherein the first light-shielding layer is formed adjacent to first pixel electrode;
wherein the second light-shielding layer is formed adjacent to the second pixel electrode; and
wherein a first overlapping width is defined by the opaque layer and the first light-shielding layer, and a second overlapping width is defined by the opaque layer and the second light-shielding layer.

24. The fabrication method for a liquid crystal display as claimed in claim 23, wherein the first overlapping width is equal to the second overlapping width.

25. The fabrication method for a liquid crystal display as claimed in claim 23, wherein the first overlapping width is different from the second overlapping width.

26. The fabrication method for a liquid crystal display as claimed in claim 25, wherein the first overlapping width is larger than the second overlapping width.

27. The fabrication method for a liquid crystal display as claimed in claim 26, wherein the first overlapping width is 6.5~7.5 μm and the second overlapping width is 4.5~5.5 μm.

28. The fabrication method for a liquid crystal display as claimed in claim 23, further comprising steps of:
forming a color filter layer overlying the second substrate;
forming a common electrode overlying the color filter layer and the opaque layer; and
forming an alignment layer overlying the common electrode.

29. The fabrication method for a liquid crystal display as claimed in claim 23, further comprising a step of forming a liquid crystal layer between the first substrate and the second substrate.

30. A fabrication method for a liquid crystal display device, comprising steps of:
providing a first substrate;
forming a plurality of scanning bus lines and a plurality of light-shielding layers overlying the first substrate;
forming a gate insulating layer overlying the first substrate to cover the scanning bus lines and the light-shielding layers;
forming a plurality of data bus lines overlying the gate insulating layer, wherein the data bus lines and the scanning bus lines are arranged in a matrix form to define a plurality of pixel areas;
forming a plurality of TFT devices in the pixel areas respectively;
forming a first pixel electrode and a second pixel electrode overlying the passivation layer in the pixel areas respectively;
providing a second substrate opposing to the first substrate; and
forming an opaque layer overlying the second substrate;
wherein one of the data bus lines is disposed between the first pixel electrode and the second pixel electrode; and
wherein, a first space is kept between the data bus line and the first pixel electrode, and a second space is kept between the data bus line and the second pixel electrode layer; and
wherein a first light-shielding layer is formed adjacent to the first pixel electrode, and a second light-shielding layer is formed adjacent to the second pixel electrode
wherein the opaque layer overlaps the data bus line the first space and the second space; and
wherein, a first overlapping width defined by the opaque layer and the first light-shielding layer is different from a second overlapping width defined by the opaque layer and the second light-shielding layer.

31. The fabrication method for a liquid crystal display device as claimed in claim 30, further comprising a step of:
forming an alignment film having a rubbing direction overlying the first pixel electrode, the second pixel electrode, and the passivation layer;
wherein an included angle between the rubbing direction and the data bus line is 40~50 degrees, the first space between the data bus line and the first pixel electrode is a liquid crystal reverse region, and the second space between the data bus line and the second pixel electrode is a liquid crystal non-reverse region; and
wherein, the first overlapping width is larger than the second overlapping width.

32. The fabrication method for a liquid crystal display device as claimed in claim 31, wherein the first overlapping width is 6.5~7.5 μm and the second overlapping width is 4.5~5.5 μm.

33. The fabrication method for a liquid crystal display as claimed in claim 30, wherein the first space is equal to the second space.

34. The fabrication method for a liquid crystal display as claimed in claim 30, wherein the first space is different from the second space.

35. The fabrication method for a liquid crystal display as claimed in claim 34, wherein the first space is larger than the second space.

36. The fabrication method for a liquid crystal display as claimed in claim 35, wherein the first space is 4~5 μm and the second space is 2~3 μm.

37. The fabrication method for a liquid crystal display as claimed in claim 30, further comprising steps of:
forming a color filter layer overlying the second substrate;
forming a common electrode overlying the color filter layer and the opaque layer; and
forming an alignment layer overlying the common electrode.

38. The fabrication method for a liquid crystal display as claimed in claim 30, further comprising a step of forming a liquid crystal layer between the first substrate and the second substrate.

* * * * *